UNITED STATES PATENT OFFICE.

JOHN A. MOFFITT, OF ARLINGTON, MASSACHUSETTS.

FIRE-PROOF MATERIAL FOR CEILINGS, WALLS, SAFES, STOVES, FURNACES, BRICKS, &c.

SPECIFICATION forming part of Letters Patent No. 267,755, dated November 21, 1882.

Application filed April 14, 1882. (No specimens.)

*To all whom it may concern:*

Be it known that I, JOHN A. MOFFITT, of Middlesex and Arlington, in the county of State of Massachusetts, have invented certain Improvements in Fire-Proof Material for Ceilings, Walls, Safes, Stoves, Furnaces, Bricks, &c.; and I hereby declare that the following is a full, clear, and exact description of the same.

To produce a material composed of ingredients endowed with the capacity of permanently resisting the action of intense heat without cracking or warping is the object of my present invention, which consists in a base of infusoria (*Diatomaceæ*,) combined with a cohesive agent, for purposes where light specific gravities are desirable or necessary—such as for lining of safes, steam-cars, ceilings, or floors of apartments, &c.; and it also consists in the addition to the above composition of silicious ingredients for purposes where the composition or articles made therefrom should be of greater specific gravity—such as stove and furnace linings, bricks, and walls of buildings, &c.

I will now describe the formula which I prefer to adopt in the manufacture of compositions and articles for use where considerable weight is desirable or necessary.

Of infusoria or equivalent I take twenty-five parts, by weight; of sulphuric acid, (diluted in water,) two parts, by weight; of fire-clay in a powdered state, by weight, five parts; of asbestus in a fibrous state, by weight, three parts; of powdered silica, fluor or feld spar, by weight, three parts.

Sulphurous acid may be substituted for the sulphuric acid enumerated in the foregoing formula.

The quantity of water in which the sulphuric acid is diluted should be sufficient to convert the combined ingredients to a plastic state when thoroughly incorporated by mixing and stirring them together in a suitable receptacle, after which the composition is given the desired shape by pressing it in a mold to form a brick or tile, or by pouring it between guides to form the floor of a building, or between the inner and outer casings of a safe or vault to form a lining therefor. When said composition is to be converted into bricks, tiles, or other analogous articles, it should be baked in an oven or otherwise dried, to extract the moisture therefrom, in order to cause it to set or harden. For linings of safes and floors of buildings the drying process may be omitted, and when employed for walls and ceilings of apartments the heat of a stove or other apparatus is sufficient. For linings of safes, refrigerators, plastering of walls and ceilings, I prefer to employ the silicates of soda, potash, or magnesia, or lime and its carbonates.

Augite schist or mica schist, either separately or combined, are frequently used by me with the infusoria (*Diatomaceæ*) and its cohesive agent.

I claim—

1. A fire-proof material of light weight, composed of infusoria (*Diatomaceæ*) and a cohesive agent, substantially as set forth.

2. A fire-proof material of light weight, composed of infusoria (*Diatomaceæ*) and a cohesive agent, the latter consisting of a mixture of sulphuric acid, fire-clay, and asbestus, substantially as described.

3. A fire-proof material of heavy weight, composed of infusoria, (*Diatomaceæ*,) a cohesive agent, and silica, as specified.

4. A fire-proof material of heavy weight, composed of infusoria (*Diatomaceæ*) and a cohesive agent consisting of a mixture of sulphuric acid, asbestus, and fire-clay, in combination with powdered silica, fluor or feld spar, as set forth.

Witness my hand this 21st day of March, 1882.

JOHN A. MOFFITT.

In presence of—
N. W. STEARNS,
ARTHUR H. BLANEY.